United States Patent
Matsuzawa et al.

(10) Patent No.: US 8,179,471 B2
(45) Date of Patent: May 15, 2012

(54) FOCUSING DEVICE AND IMAGE PICKUP APPARATUS

(75) Inventors: Toru Matsuzawa, Kunitachi (JP); Yoshinobu Tanaka, Hachioji (JP); Eiji Igarashi, La Paz (BO)

(73) Assignee: Olympus Corporation, Tokyo (JP)

( * ) Notice: Subject to any disclaimer, the term of this patent is extended or adjusted under 35 U.S.C. 154(b) by 301 days.

(21) Appl. No.: 12/696,444

(22) Filed: Jan. 29, 2010

(65) Prior Publication Data

US 2010/0194972 A1    Aug. 5, 2010

(30) Foreign Application Priority Data

Jan. 30, 2009  (JP) ................................. 2009-020164

(51) Int. Cl.
*H04N 5/232*    (2006.01)
(52) U.S. Cl. ........................ 348/349; 348/345
(58) Field of Classification Search .................. 348/345, 348/348, 349, 350; 396/119, 120, 121, 123
See application file for complete search history.

(56) References Cited

U.S. PATENT DOCUMENTS 7,894,716 B2 * 2/2011 Asano ........................... 396/123
2011/0013073 A1 * 1/2011 Okawara ....................... 348/345

FOREIGN PATENT DOCUMENTS

JP    2001-043458 A    2/2001

\* cited by examiner

*Primary Examiner* — Tuan Ho
(74) *Attorney, Agent, or Firm* — Westerman, Hattori, Daniels & Adrian, LLP

(57) ABSTRACT

A focusing device includes a distance information acquisition section acquiring information on a distance to a subject based on a plurality of image data acquired by taking images of the subject at a plurality of different viewpoint positions. A subject detection section detects a first area and a second area based on the distance information and threshold information for the distance range within which a subject of interest that obstructs a main subject in the subject is present. In the first area, the subject of interest is present in each of the plurality of image data. In the second area, the subject of interest is not present. A focusing estimation section estimates the focusing of the main subject based on the distance information on the second area in each of the plurality of image data.

20 Claims, 6 Drawing Sheets

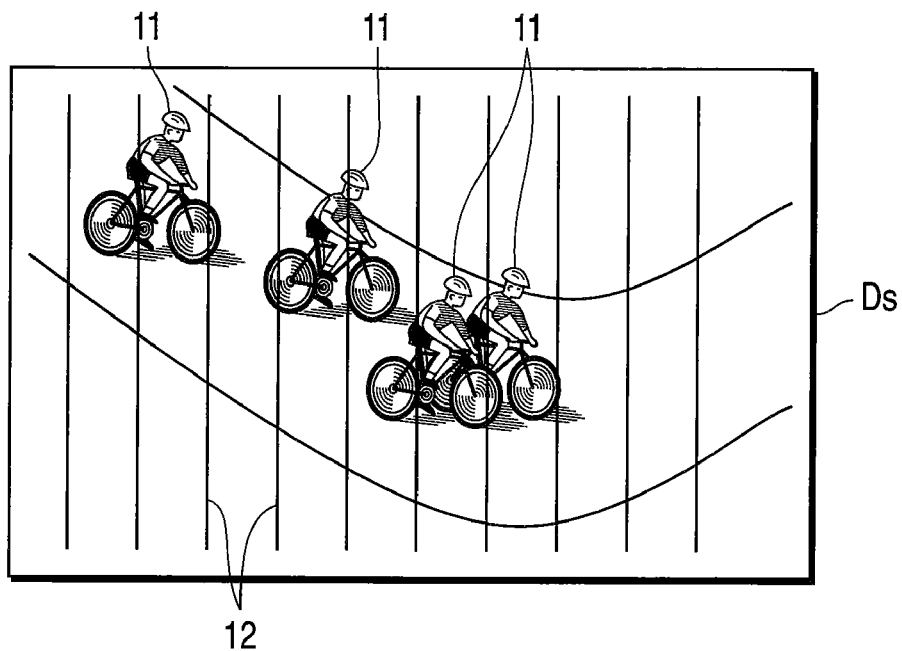
F I G. 6A
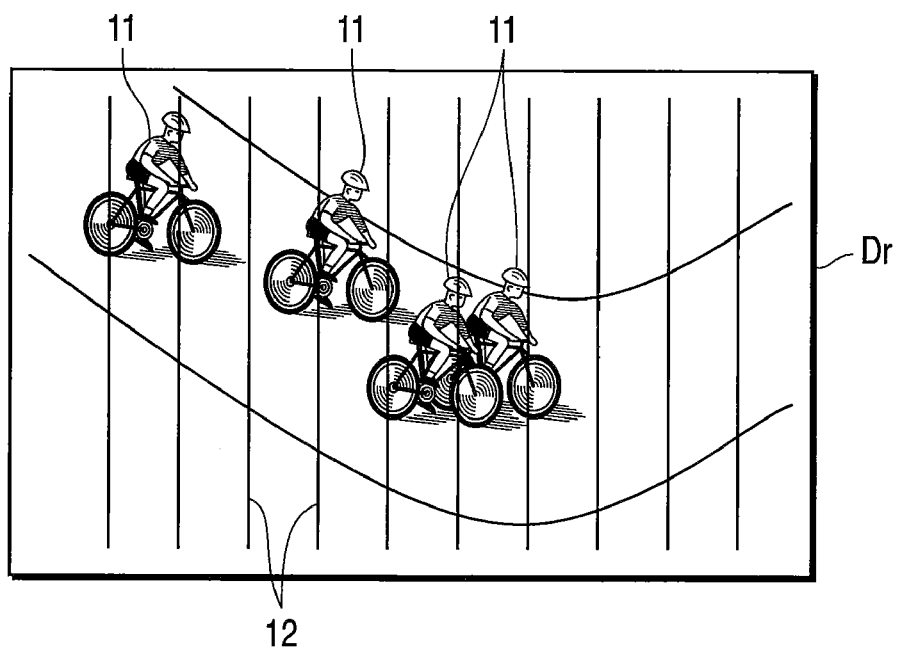
F I G. 6B

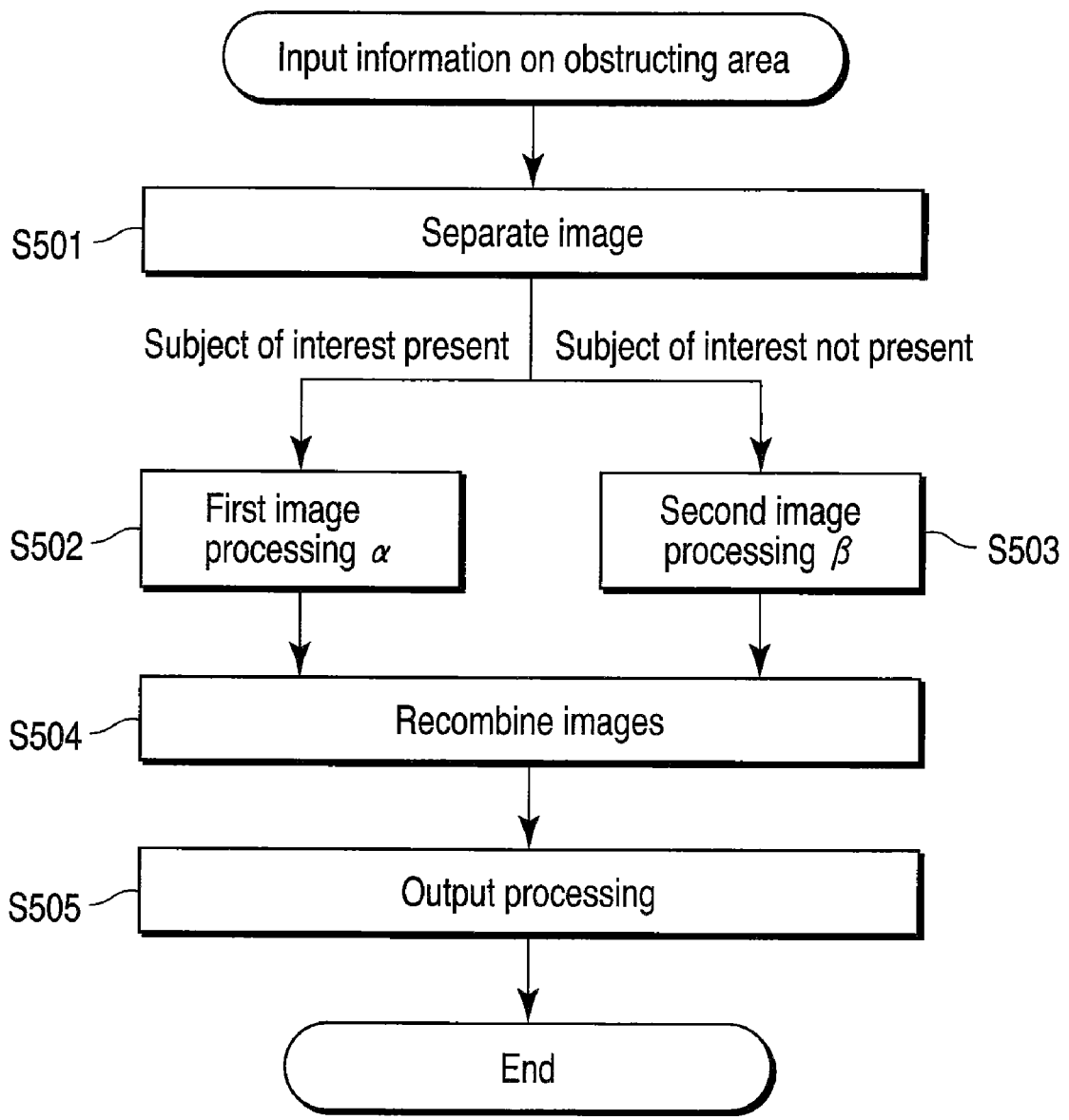
F I G. 7

FOCUSING DEVICE AND IMAGE PICKUP APPARATUS

CROSS-REFERENCE TO RELATED APPLICATIONS

This application is based upon and claims the benefit of priority from prior Japanese Patent Application No. 2009-020164, filed Jan. 30, 2009, the entire contents of which are incorporated herein by reference.

BACKGROUND OF THE INVENTION

1. Field of the Invention

The present invention relates to a focusing device and an image pickup apparatus configured to be able to focus on a subject even when an obstruction is present in front of the subject.

2. Description of the Related Art

An image pickup apparatus is used to take images of various scenes. If an obstruction is present between the image pickup apparatus and a main subject, the main subject may be hidden behind the obstruction, preventing the desired image from being obtained. For example, Jpn. Pat. Appln. KOKAI Publication No. 2001-43458 discloses a technique to remove an obstruction by extracting a background image from the motion parallax of the obstruction if the obstruction is, for example, a person or a vehicle. Specifically, Jpn. Pat. Appln. KOKAI Publication No. 2001-43458 discloses a technique to generate image data containing the background free from the obstruction by comparing a plurality of image data obtained at different points in time with one another for each pixel, extracting pixels in which no change has been detected for a predetermined period of time, as background image data, and executing the process of extracting background image data for, for example, all the pixels in a monitor zone.

BRIEF SUMMARY OF THE INVENTION

A focusing device according to a first aspect of the present invention comprises a distance information acquisition section configured to acquire information on a distance to a subject based on a plurality of image data acquired by taking images of the subject at a plurality of different viewpoint positions; a subject detection section configured to detect a first area and a second area based on the distance information obtained by the distance information acquisition section and threshold information for the distance range within which a subject of interest that obstructs a main subject in the subject is present, the subject of interest being present in the first area in each of the plurality of image data, the subject of interest not being present in the second area; and a focusing estimation section configured to carry out the focusing estimation on the main subject based on the distance information on the second area in each of the plurality of image data.

An image pickup apparatus according to a second aspect of the present invention comprises, a distance information acquisition section configured to acquire information on a distance to a subject based on a plurality of image data acquired by taking images of the subject at a plurality of different viewpoint positions; a subject detection section configured to detect a first area and a second area based on the distance information obtained by the distance information acquisition section and threshold information for the distance range within which a subject of interest that obstructs a main subject in the subject is present, the subject of interest being present in the first area in each of the plurality of image data, the subject of interest not being present in the second area; a focusing estimation section configured to carry out the focusing estimation on the main subject based on the distance information on the second area in each of the plurality of image data; and an image generating section configured to acquire image data by taking images of the subject including the main subject on which the focusing estimation has been carried out by the focusing estimation section.

BRIEF DESCRIPTION OF THE SEVERAL VIEWS OF THE DRAWING

FIG. 6A is a schematic diagram showing one of the images in two frames acquired first by an image input section in a second embodiment of an image pickup apparatus comprising a focusing device according to the present invention;

FIG. 6B is a schematic diagram showing the other of the images in the two frames acquired first by the image pickup apparatus;

FIG. 7 is a flowchart of the basic operation of an image generating section of the image pickup apparatus;

DETAILED DESCRIPTION OF THE INVENTION

A first embodiment of the present invention will be described below with reference to the drawings.

Figure 1:
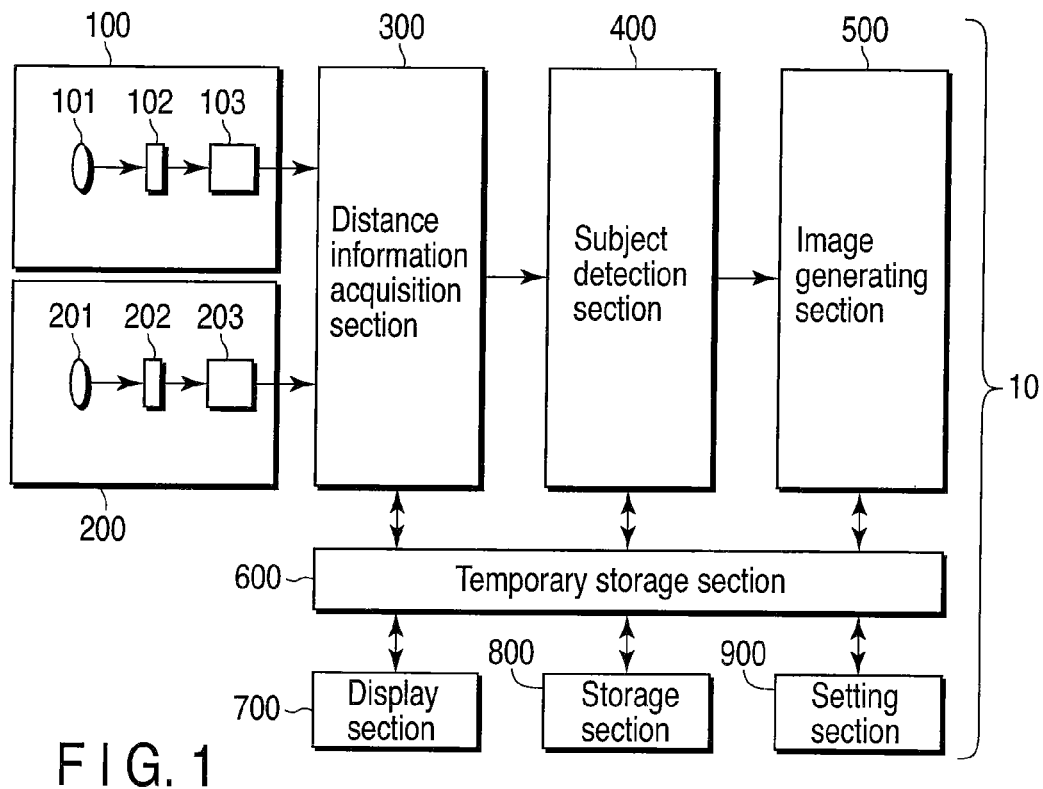
FIG. 1 is a diagram showing the configuration of a first embodiment of an image pickup apparatus that is a twin-lens stereo camera comprising a focusing device according to the present invention.

FIG. 1 is a diagram showing the configuration of an image pickup apparatus of a twin-lens stereo camera including a focusing device. The subject includes both a main subject and a background subject (subject of interest, the subject other than the main subject). The main subject is, for example, a person 11 as shown in FIG. 6A. The subject of interest is an obstruction such as a fence 12.

The present apparatus 10 includes, for example, two image pickup sections 100 and 200 as an image input section. The present apparatus includes a distance information acquisition section 300, a subject detection section 400, an image generating section 500, a temporary storage section 600, a display section 700, a storage section 800, and a setting section 900.

The two image pickup sections 100 and 200 pick up images at respective different viewpoint positions to acquire image signals for a plurality of frames for each viewpoint position. The image pickup sections 100 and 200 form a stereo camera. The image pickup section 100 includes an optical system 101, an image pickup element 102, and storage section 103. The image pickup section 200 includes an optical system 201, an image pickup element 202, and storage section 203.

Each of the optical systems 101 and 201 focuses a light flux from the subject to form an image on the corresponding one of the image pickup elements 102 and 202. Each of the image pickup elements 102 and 202 converts the subject image formed by the corresponding one of the optical systems 101 and 102, into an analog electric signal and then converts the analog electric signal into a digital signal (pixel signal). The digital signal (image signal) is stored in the corresponding one of the storage section 103 and 203. Each of the storage section 103 and 203 is configured to temporarily store the image signal provided by the corresponding one of the image pickup elements 102 and 202.

The apparatus 10 is configured as a twin-lens stereo camera including the two image pickup sections 100 and 200. The present apparatus 10 is not limited to the two image pickup sections 100 and 200 but may includes, for example, at least three image pickup sections. The present apparatus 10 may includes at least one image pickup section configured to take an image a number of times with a viewpoint position changed.

Figure 2:
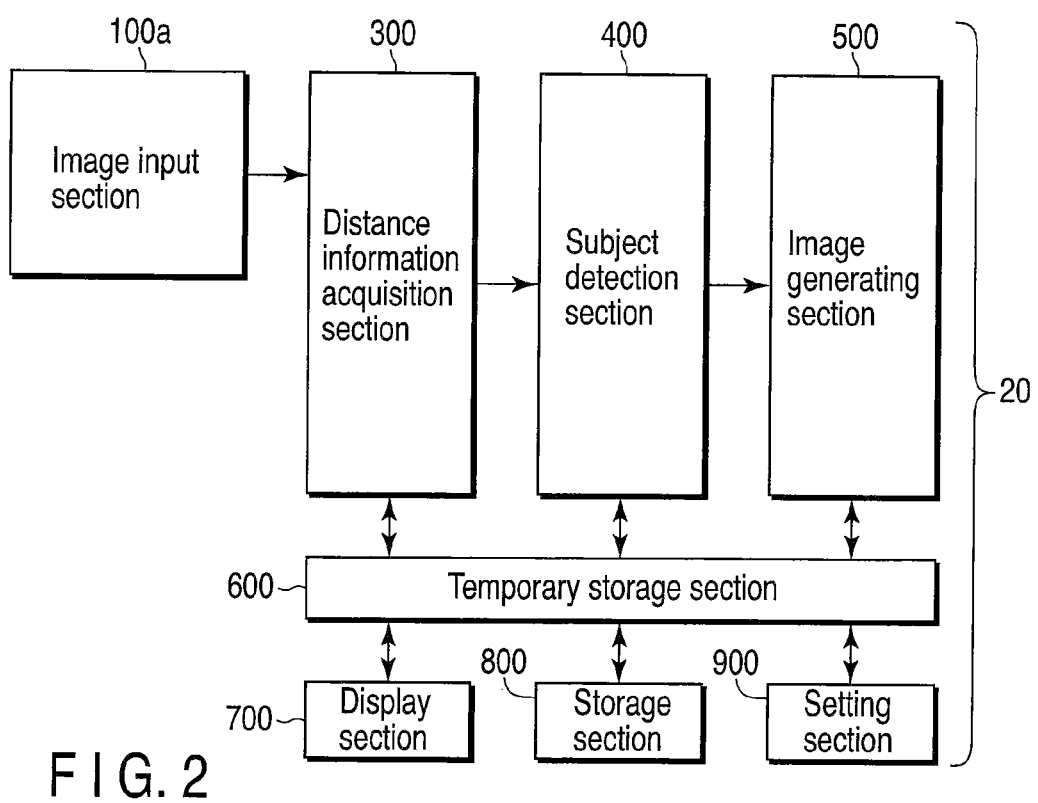
FIG. 2 is a diagram showing the configuration of an image input section provided in the image pickup apparatus instead of two image pickup sections.

The present apparatus 10 is also applicable to, for example, an image processing apparatus in which such an image processing program as shown in FIG. 2 is installed. The image processing apparatus 20 basically has substantially the same configuration as that of the image pickup apparatus 10 shown in FIG. 1. The image processing apparatus 20 is different from the image pickup apparatus 10 in that an image input section 100a is provided instead of, for example, the two image pickup sections 100 and 200.

The image input section 100a acquires image signals for a plurality of frames acquired by image taking at respective different viewpoint positions. The image input section 100a includes any storage medium in which image signals for a plurality of frames are pre-stored. The image input section 100a may also provide the function of outputting image signals for a plurality of frames to the storage medium. The storage section 800 may have the function of the image input section 100a.

The distance information acquisition section 300 uses image signals for N frames (N≧2) provided by each of the two image pickup sections 100 and 200 to acquire information on the distance to the subject in pixel unit. The distance information acquisition section 300 acquires information on the distance to the subject based on a plurality of image data acquired at a plurality of different viewpoint positions, for example, a plurality of image data acquired by each of the two image pickup sections 100 and 200.

The distance information acquisition section 300 sequentially acquires distance information for each of a plurality of image consecutively acquired at a plurality of different viewpoint positions, for example, each of a plurality of image data obtained by each of the two image pickup sections 100 and 200. A set of distance information acquired by the distance information acquisition section 300 in pixel unit is hereinafter referred to as distance image data.

The distance information acquisition section 300 references area information indicating whether or not the subject of interest extracted by the subject detection section 400 is present to execute a focusing estimation process again.

The subject detection section 400 uses distance image data acquired by the distance information acquisition section 300 to detect an area in which the subject of interest is present. Specifically, the subject detection section 400 receives distance threshold information set by a photographer to binarize information on the distance to the subject acquired by the distance information acquisition section 300, based on the threshold information. The subject detection section 400 thus acquires binary information for each pixel.

The subject detection section 400 detects a first area and a second area based on the distance information and threshold information acquired by the distance information acquisition section 300. The threshold information indicates the distance range within which the subject of interest obstructing the main subject is present. In the first area, the subject of interest is present in each of the plurality of image data. In the second area, the subject of interest is not present.

The subject detection section 400 detects the first area and the second area in each of the plurality of consecutively acquired image data.

The distance information acquisition section 300 estimates the focusing of the main subject based on the distance information on the second area in each of the plurality of image data obtained by, for example, the two image pickup sections 100 and 200 in which area the subject of interest is not present (focusing estimation section). The distance information acquisition section 300 sequentially estimates the focusing of the focusing of the main subject based on the distance information on the second area sequentially detected by the subject detection section 400 (focusing estimation section). The distance information acquisition section 300 uses image data on the second area in which the subject of interest is not present to estimate the focusing of the main subject by means of hill climbing (focusing estimation section).

The image generating section 500 executes predetermined image processing based on area information extracted by the subject detection section 400 is present and indicating whether or not the subject of interest.

The temporary storage section 600 temporarily stores data processed by the distance information acquisition section 300, the subject detection section 400, and the image generating section 500.

The display section 700 displays various image data.

The storage section 800 stores image data acquired by the image generating section 500.

The setting section 900 is an operation section operated by the photographer to make various settings, for example, to set an operation mode for face detection in which the face site of a human body corresponding to the subject, is detected.

Figure 3:
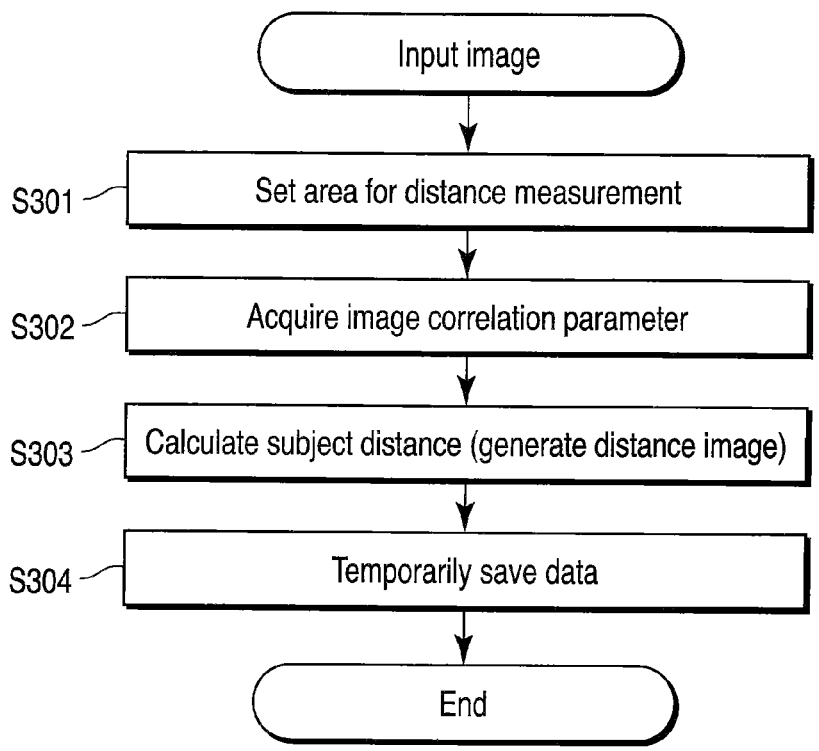
FIG. 3 is a flowchart showing a basic operation performed by a distance information acquisition section of the image pickup apparatus to calculate distance information.

The specific operation of the distance information acquisition section 300 will be described with reference to a flowchart of a basic operation for roughly calculating distance information as shown in FIG. 3. The two image pickup sections 100 and 200 are hereinafter referred to as image input means 100 and 200.

Image data on a plurality of frames from the image input sections 100 and 200 is input to the distance information acquisition section 300. Then, in step S301, the distance information acquisition section 300 sets an area for which distance information is acquired from the image data on the plurality of frames. The distance information acquisition area may be set, for example, by the photographer by operating the setting section 900 or automatically by the distance information acquisition section 300.

In step S302, for the set distance information acquisition area, the distance information acquisition section 300 calculates corresponding points among the image data for the plurality of frames by an image correlation method. The distance information acquisition section 300 stores a correlation parameter for the calculated corresponding points in the temporary storage section 600.

In step S303, the distance information acquisition section 300 calculates information on the distance to the subject for each pixel based on the correlation parameter for the corresponding points.

In step S304, the distance information acquisition section 300 acquires distance image data based on the calculated information on the distance to the subject for each pixel. The distance information acquisition section 300 stores the distance image data in the temporary storage section 600. The distance information acquisition section 300 acquires information on the distance to the subject based on the plurality of image data obtained at different viewpoint positions, for example, the plurality of image data obtained by each of the two image pickup sections 100 and 200. The distance information acquisition section 300 sequentially acquires distance information for each of the plurality of image data consecutively acquired at different viewpoint positions, for example, the plurality of image data obtained by each of the two image pickup sections 100 and 200.

The specific operation of the subject detection section 400 will be described with reference to a flowchart of the basic operation of the subject detection section 400 shown in FIG. 4.

In step S401, the subject detection section 400 receives distance threshold information set by the photographer from, for example, the setting section 900. The threshold information is set, for example, by the photographer by operating the setting section 900.

In step S402, upon receiving the set threshold information, the subject detection section 400 reads distance image data stored in the temporary storage section 600. The subject detection section 400 compares the magnitude of the distance information for each pixel in the distance image data with the magnitude of the threshold information. In accordance with the magnitudes of the distance information and the threshold information, the distance information for each image in the distance image data is binarized.

In step S403, the subject detection section 400 binarizes the distance information for each pixel based on the threshold information and then stores the binary information for each pixel in the temporary storage section 600. The subject detection section 400 detects a first area and a second area based on the distance information and threshold information acquired by the distance information acquisition section 300. The threshold information indicates the distance range within which the subject of interest that obstructs the main subject is assumed to be present. In the first area in each of the plurality of image data, the subject of interest is present. In the second area, the subject of interest is not present. The subject detection section 400 sequentially detects the first area and the second area for every plural consecutively-acquired image data.

Figure 5:
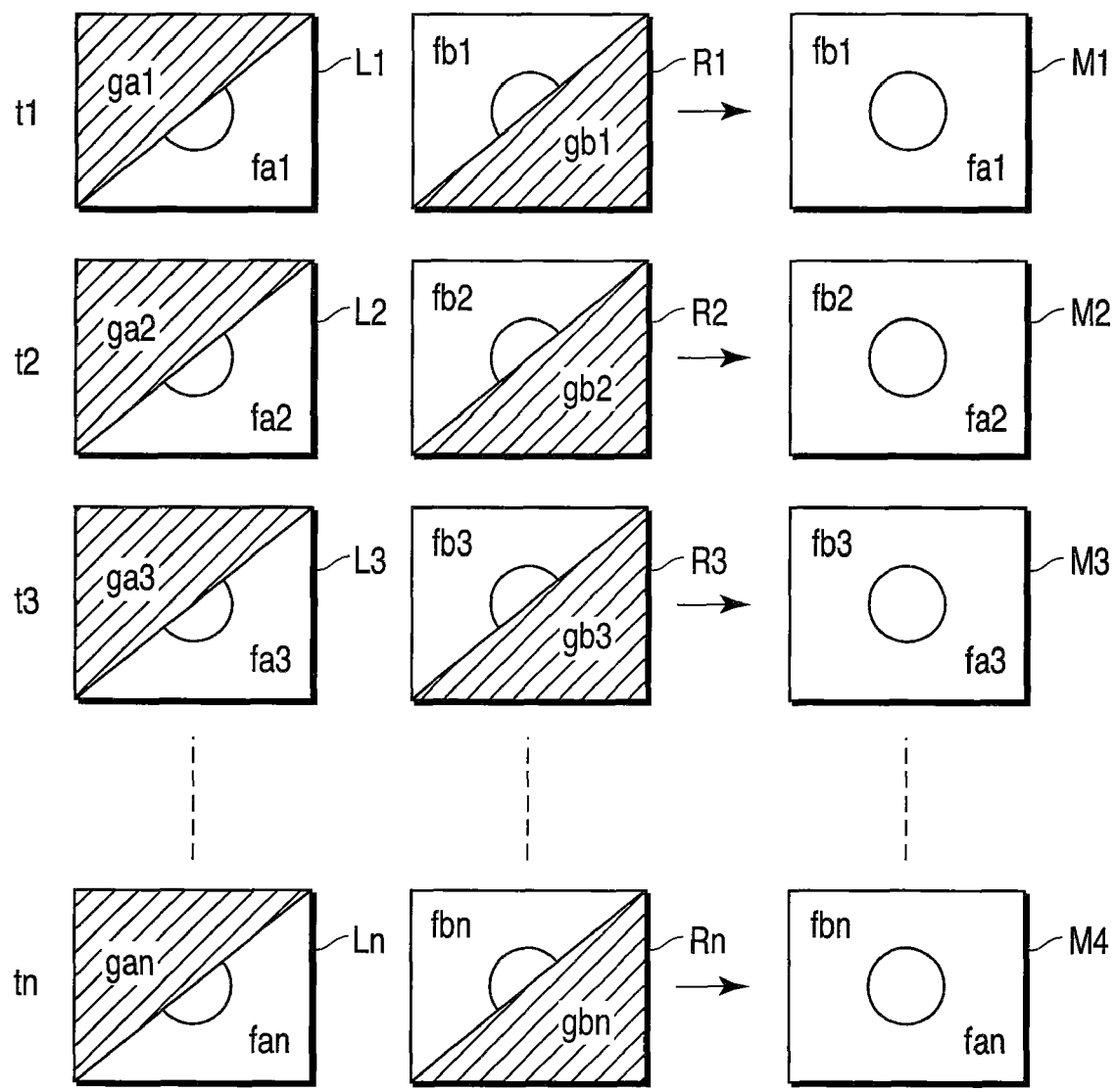
FIG. 5 is a schematic diagram showing a first area in which a subject of interest that obstructs a main subject is present and a second area in which the subject of interest is not present, in each of a plurality of image data consecutively acquired by the image pickup apparatus as time elapses.

FIG. 5 schematically shows the first area and second area for every plural image data consecutively acquired as time elapses from t1 to tn, for example, for every plural image data obtained by each of the two image pickup sections 100 and 200. A plurality of image data L1 to Ln obtained by the image pickup section 100 contain respective first areas ga1 to gan in which the subject of interest is present and respective second areas fa1 to fan in which the subject of interest is not present. A plurality of image data R1 to Rn obtained by the image pickup section 200 contain respective first areas gb1 to gbn in which the subject of interest is present and respective second areas fb1 to fbn in which the subject of interest is not present.

The distance information acquisition section (focusing estimation section) 300 detects focusing in an image signal for a non-obstructing area portion in the image data for the plurality of frames based on the binary information for each pixel stored in the temporary storage section 600. The focusing detection processing is based on the most common technique called hill climbing or a contrast method and widely used for electronic image pickup apparatuses such as digital cameras.

The distance information acquisition section (focusing estimation section) 300 estimates the focusing of the main subject based on the distance information on the second areas fa1 to fan and fb1 to fbn in the plurality of image data obtained by, for example, the two image pickup sections 100 and 200 as shown in FIG. 5.

The distance information acquisition section (focusing estimation section) 300 sequentially estimates the focusing of the main subject based on the distance information on the second areas fa1 to fan and fb1 to fbn sequentially detected by the subject detection section 400.

The distance information acquisition section (focusing estimation section) 300 uses the image data on the second areas fa1 to fan and fb1 to fbn in which the subject of interest is not present to estimate the focusing of the main subject by hill climbing.

For example, the distance information acquisition section (focusing estimation section) 300 first estimates the focusing of the main subject based on the distance information on the second areas fa1 and fb1 sequentially detected by the subject detection section 400 at points in time t1 to to as time elapses as shown in FIG. 5. FIG. 5 schematically shows that the focusing of the main subject is estimated based on the distance information in image data M1 composed of the second areas fa1 and fb1 in which the subject of interest is not present at point in time t1.

If no focusing of the main subject is detected at point in time t1, then at point in time t2, the distance information acquisition section (focusing estimation section) 300 estimates the focusing of the main subject based on the distance information on the second areas fa2 and fb2 sequentially detected by the subject detection section 400. At this time, the distance information acquisition section (focusing estimation section) 300 estimates the focusing of the main subject based on the distance information in image data M2 composed of the second areas fa2 and fb2 in which the subject of interest is not present.

Similarly, until the focusing of the main subject is detected, the distance information acquisition section (focusing estimation section) 300 estimates, between time t3-tn, the focusing of the main subject based on the distance information on the second areas fa2 to fan and fb2 to fbn sequentially detected by the subject detection section 400.

The basic configuration and operation of a focusing detection process based on hill climbing will be described.

Each of the optical systems 101 and 201 includes a plurality of lens groups. The plurality of lens groups are intended to take images, for example, groups of taking lenses. Some of the plurality of lens groups can be driven in the direction of the optical axis in order to adjust the focus. The lenses of these lens groups are called focus lenses.

Images of the subject formed by the optical systems 101 and 201 are converted into electric signals by photoelectric conversion elements of the image pickup elements 102 and 202.

The focus lenses of the optical systems 101 and 201 are moved in the direction of the optical axis. An evaluation value for blur in a plurality of image data taken during the movement of the focus lenses is calculated. The contrast in the image data and the sum of high frequency components is used as the evaluation value. A larger evaluation value indicates that the subject is in better focus.

The distance information acquisition section 300 estimates focusing by peak estimation. The distance information acquisition section (focusing estimation section) 300 estimates focusing utilizing the fact that a larger evaluation value indicates that the subject is in better focus.

Thus, according to the present invention, information on the distance to the subject is obtained based on a plurality of image data taken at a plurality of different viewpoint positions. Based on the distance information and the threshold information on the distance range within which the subject of interest that obstructs the main subject is assumed to be present, the first area and the second area are detected. Then, based on the distance information on the second area in which the subject of interest is not present, the focusing of the main subject is estimated. Thus, even if the obstruction is stationary, the subject can be appropriately brought into focus.

Now, a second embodiment of the present invention will be described. An image pickup apparatus according to the present embodiment has the same configuration as that of the image pickup apparatus according to the above-described first embodiment. Thus, the second embodiment will also be described with reference to FIG. 1, described above.

In the present apparatus, a subject detection section 400 acquires binary information, and the subject is then detected by image recognition, for example, a face detection process is carried out in which the face site of a human body corresponding to the subject is detected.

The subject detection section 400 generates a plurality of evaluation values using, as indices, the similarities of a plurality of feature points of the main subject in a plurality of the image data. The subject detection section 400 then integrates the plurality of evaluation values together to determine whether or not the second area corresponds to the main subject based on the integrated evaluation values for the second area (image recognition section).

The subject detection section (image recognition section) 400 generates and integrates evaluation values for the appropriate areas of the main subject, for example, the face site of a human body corresponding to the subject. Before generating and integrating the evaluation values for the appropriate areas of the main subject, for example, the face site of the human body, the subject detection section (image recognition section) 400 determines the evaluation values for the obstructing area with the subject of interest to indicate a part of the main subject.

The setting section 900 is set to a face detection operation mode. The present apparatus 10 includes a database in which the feature points of the face site are registered. The database may be formed in, for example, the storage section 800.

The subject detection section (image recognition section) 400 detects, for example, the face site of a person 11 corresponding to the subject, by means of image recognition. That is, when the face detection operation mode is set, the subject detection section (image recognition section) 400 normalizes the image data and the feature points based on image data acquired by the image input sections 100 and 200 and data indicative of the feature points of the face site pre-registered in the database. Thereafter, the subject detection section (image recognition section) 400 uses a predetermined filter process corresponding to a pattern collation process to generate evaluation values using, as an index, the similarity between the image data and each of the feature points. The evaluation values do not allow the face site corresponding to the main subject at the time of generation of the evaluation values to be recognized but are the results of collation for the face site or in smaller unit sites. Thus, a plurality of evaluation values are generated for one face site.

After acquiring the binary information, the subject detection section (image recognition section) 400 integrates the evaluation values together based on, for example, the components of the face site of the person 11, such as the eyes, the nose, and the face line. Based on the reliability (similarity) of the area resulting from the integration process, the subject detection section (image recognition section) 400 determines whether or not the area corresponds to the face site. Upon determining that the area corresponds to the face site, the subject detection section (image recognition section) 400 stores coordinate information on the area determined to correspond to the face site, in the temporary storage section 600.

When a common face detection process is carried out with the main subject (face site) obstructed by, for example, an obstacle that is an obstruction, the reliability (similarity) of the area resulting from the integration process may not be accurately owing to the adverse effect of the obstructing area.

After acquiring the binary information and before integrating the evaluation values together based on, for example, the components of the face site such as the eyes, the nose, and the face line, the subject detection section 400 carries out a uniquely determining process, for example, determines all the evaluation values for the obstructing area to indicate a part of the face site, based on the binary information for each pixel. After the determination, the above-described integration process is carried out.

The operation of the image pickup apparatus will be described.

Images acquired first by the image input sections 100 and 200 are specifically assumed to be image data for two frames shown in FIGS. 6A and 6B. The image data shown in FIG. 6A serves as a criterion when the image correlation method is carried out to calculate a distance image (this image data is hereinafter referred to as criterion image data Ds). The image data shown in FIG. 6B is referenced when the image correlation method is carried out to calculate a distance image (this image data is hereinafter referred to as reference image data Dr).

In both the criterion image data Ds and the reference image data Dr, a person 11 is a main subject, and a fence 12 or the like present in front of the person 11 is an obstruction against the main subject.

The present apparatus 10 calculates distance image data using the criterion image data Ds and the reference image data Dr. Based on the calculated distance image data, the present apparatus 10 detects the subjects using the obstruction such as the fence 12 as a subject of interest. The present apparatus 10 thus separates the criterion image data Ds into an area in which the obstruction such as the fence 12 corresponding to the subject of interest, is present and an area in which the obstruction is not present. Thereafter, the present apparatus 10 estimates the focusing of the area in which the obstruction such as the fence 12 is not present.

Now, the operation will be specifically described.

The distance information acquisition section 300 acquires distance image data in accordance with the flowchart of the basic operation for roughly calculating distance information as shown in FIG. 3. Before acquiring distance image data, the photographer operates the setting section 900 to select the criteria image data Ds and the reference image data Dr and sets a distance image acquisition area in the criteria image data Ds. For example, the distance information acquisition area is set to be the entire area of the criteria image data Ds shown in FIG. 6A.

In response to the setting operation performed on the setting section 900, in step S302, the distance information acquisition section 300 uses the image correlation method to calculate, for the set distance image acquisition area, the corresponding points between the image data for the plurality of frames. The image correlation method involves, for example, calculating the amount of the correlation between the image data. The distance information acquisition section 300 stores the calculated correlation parameters for the corresponding points, in the temporary storage section 600.

In step S303, based on the correlation parameters for the corresponding points, the distance information acquisition section 300 calculates information on the distance to the subject for each pixel in the distance information acquisition area in the criterion image data Ds.

In step S304, the distance information acquisition section 300 stores the distance information in the temporary storage section 600 as distance image data including the subject distance. The distance information acquisition section 300 stores information on the correspondence between the pixel position (XY coordinates) and subject distance in the distance information acquisition area in the criterion image data Ds in the temporary storage section 600.

That is, as described above, the distance information acquisition section 300 acquired information on the distance to the subject based on a plurality of image data taken at a plurality of different viewpoint positions, for example, a plurality of image data obtained by each of the two image pickup sections 100 and 200.

The distance information acquisition section 300 sequentially acquires distance information for each of a plurality of image data taken at a plurality of consecutively-acquired different viewpoint positions, for example, a plurality of image data obtained by each of the two image pickup sections 100 and 200. The distance information acquisition section 300 then stores the distance information in the temporary storage section 600 as distance image data including the subject distance.

Figure 4:
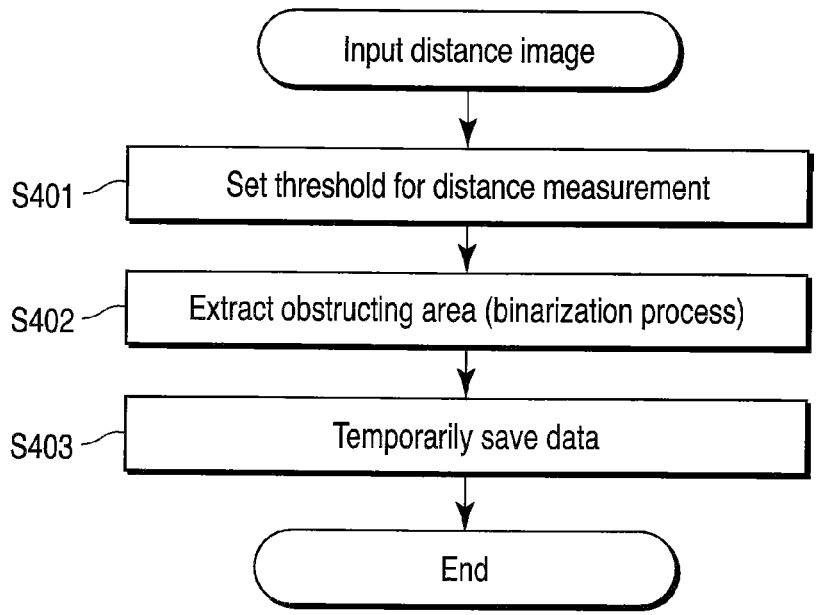
FIG. 4 is a flowchart showing the basic operation of a subject detection section of the image pickup apparatus.

The subject detection section 400 detects the subject of interest in accordance with a flowchart in FIG. 4 showing the basic operation of the subject detection section 400.

In step S401, the subject detection section 400 receives distance threshold information set by the photographer from, for example, the setting section 900. The threshold information is set, for example, by the photographer by operating the setting section 900. Specifically, the photographer sets the distance range within which the subject of interest corresponding to the fence 12 or the like, is assumed to be present, that is, the same distance as that to the fence 12 or a distance slightly longer than that to the fence 12, to be threshold information. The photographer changes focal distance, for example, changes scale such that the vicinity of the obstruction, for example, the fence 12 is focused on.

Upon receiving the operation from the setting section 900, the subject detection section 400 automatically calculates the distance to the subject from the margin of the threshold and the focal distances of the optical systems 101 and 201. The subject detection section 400 then sets the distance to the subject to be distance threshold information. The method for determining the focal distance is not limited to optical zooming but any method for changing the focal distance, such as a zoom scale or AF control, may be used. Setting a threshold for each image taking operation may be avoided by storing threshold information set during the preceding image taking operation and using this threshold information when the scale is not changed.

In step S402, upon receiving the set threshold information, the subject detection section 400 reads the distance image data stored in the temporary storage section 600. The subject detection section 400 compares the magnitude of the distance information for each pixel in the distance image data with the magnitude of the threshold information. The subject detection section 400 thus determines whether or not the subject distance for each pixel in the distance information acquisition area is within a predetermined range. The subject detection section 400 executes a binarization process in accordance with the magnitudes of the distance information and the threshold information.

In step S403, the subject detection section 400 binarizes the distance information for each pixel based on the threshold information and then stores the binary information for each pixel, that is, the binary information indicating whether or not the subject of interest (obstruction) is present, in the temporary storage section 600.

The threshold information is set to, for example, the same distance as that from the position of the photographer to the fence 12 or a distance slightly longer than that from the position of the photographer to the position of the fence 12. If the subject distance is less than or equal to the threshold, this means that the fence 12 corresponding to the subject of interest, is present in front of the person 11 corresponding to the main subject.

The subject detection process executed by the present apparatus 10 is repeated every time the image data from each of the image input sections 100 and 200 is updated. Binary information is thus accumulated in the temporary storage section 600. As described above, based on the distance information acquired by the distance information acquisition section 300 and the threshold information on the distance range within which the subject of interest that obstructs the main subject is assumed to be present, the subject detection section 400 detects the first area in which the subject of interest is present and the second area in which the subject of interest is not present, for every plural image data consecutively acquired as time elapses.

The subject detection section 400 carries out the face detection process of detecting, for example, the face site of the person 11 corresponding to the subject. The setting section 900 is, for example, operated by the photographer so as to set the face detection operation mode.

When the face detection operation mode is set, the subject detection section 400, then based on the criterion image data Ds and reference image data Dr acquired by the image input means 100 and 200 through an image pickup operation and data indicative of the feature points of the face site pre-registered in the database (storage section 800), the subject detection section 400 normalizes the criterion image data Ds and reference image data Dr and the feature points.

The subject detection section 400 carries out the predetermined filter process on each of the feature points and the criterion image data Ds and reference image data Dr, the filter process corresponding to the pattern collation process to generate evaluation values using, as an index, the similarity between the feature point and the criterion image data Ds and reference image data Dr.

The subject detection section 400 integrates the evaluation values together based on, for example, the components of the face site, such as the eyes, the nose, and the face line. Based on the reliability (similarity) of the area resulting from the integration process, the subject detection section 400 determines whether or not the area corresponds to the face site. Upon determining that the area corresponds to the face site, the subject detection section 400 stores coordinate information on the area determined to correspond to the face site, in the temporary storage section 600.

At this time, before integrating the evaluation values together based on, for example, the components of the face site such as the eyes, the nose, and the face line, the subject detection section 400 carries out a uniquely determining process, for example, determines all the evaluation values for the obstructing area to indicate a part of the face site, based on the binary information for each pixel. After the determination, the subject detection section 400 carries out the above-described integration process. This allows the adverse effect of the obstructing area to be eliminated when the apparatus determines whether or not the area corresponds to, for example, the face site based on the reliability (similarity) of the area after the integration process.

The distance information acquisition section 300 carries out a focusing estimation process on the face site recognized by the subject detection section 400. That is, images of the subject formed by the optical systems 101 and 201 are converted into analog electric signals by the photoelectric conversion elements of the respective image pickup elements 102 and 202. The analog electric signals are then converted into digital signals (pixel signals). The digital signals (image signals) are stored in the storage section 103 and 203 as image data.

At this time, the focus lenses of the optical systems 101 and 201 are moved in the direction of the optical axis. During the movement of the focus lenses, a plurality of image data are acquired again. In the present embodiment, in a strict sense, the plurality of image data acquired with the focus lenses in motion are taken at different points in time and different angles of view. However, for convenience of description, it is assumed that the amount of blue varies among the image data as shown in the criterion image data Ds and reference image data Dr in FIGS. 6A and 6B.

Based on, for example, the criterion image data Ds and reference image data Dr reacquired and the binary information corresponding to the criterion image data Ds and the reference image data Dr, the distance information acquisition section 300 selects, from the criterion image data Ds, an image signal for the face site in which no obstruction such as the fence 12 is present and which has been detected by the above-described face detection process. The distance information acquisition section 300 uses the selected image signal for the face site to estimate focusing by means of hill climbing.

The distance information acquisition section (focusing estimation section) 300, for example, estimates the focusing of the main subject based on the distance information on the second areas fa1 to fan and fb1 to fbn in which the subject of interest is not present, in the plurality of image data obtained by each of the two image pickup sections 100 and 200, as shown in FIG. 5. The distance information acquisition section (focusing estimation section) 300 sequentially estimates the focusing of the main subject based on the distance information on the second areas fa1 to fan and fb1 to fbn sequentially detected by the subject detection section 400. In this case, the distance information acquisition section (focusing estimation section) 300 uses the image data on the second areas fa1 to fan and fb1 to fbn in which the subject of interest is not present to estimate the focusing of the main subject by hill climbing.

Thus, according to the above-described second embodiment, the subject detection section 400 estimates the focusing of the areas in which no obstruction such as the fence 12 is present, as follows. Based on the criterion image data Ds and reference image data Dr acquired by the two image pickup sections 100 and 200 and the data indicative of the feature points of the face site, the subject detection section 400 recognizes the face site of the person 11 corresponding to the main subject, for example, the eyes, the nose, or the face line. The subject detection section 400 then estimates the focusing of the recognized face site.

Since the focusing estimation is performed after the face site of the person 11 corresponding to the main subject, for example, the eyes, the nose, or the face line, has been recognized, the focusing of the person 11 corresponding to the main subject can be accurately estimated. Furthermore, the focusing estimation can be achieved without being affected by the obstruction such as the fence 12 which obstructs image taking of the person 11. Thus, even if a part of the main subject is obstructed by the obstruction such as the fence 12, an image can be acquired with the main subject accurately in focus.

Now, a third embodiment of the present invention will be described. An image pickup apparatus according to the present embodiment has the same configuration as that of the image pickup apparatus according to the above-described first embodiment. Thus, the third embodiment will also be described with reference to FIG. 1, described above.

The image generating section 500 allows the distance information acquisition section (focus estimation section) 300 to estimate focusing. The image generating section 500 then separates one of a plurality of image data into two image data based on the position of the subject of interest. The image generating section 500 carries out image processing on the two image data to acquire image data free from the subject of interest.

In the present embodiment, for example, the criterion image data Ds and reference image data Dr shown in FIGS. 6A and 6B are used to obtain the distance image data. Then, based on the distance image data, the subject such as the person 11 is automatically detected with the obstruction such as the fence 12 set to be a subject of interest. Thus, the reference image data is separated into the area in which the obstruction 12 corresponding to the subject of interest is present and the area in which the obstruction 12 is not present. Thereafter, first image processing α is carried out on the area in which the obstruction 12 corresponding to the subject of interest is present. Second image processing β that is different from the first image processing α is carried out on the area in which the obstruction 12 is not present.

Specifically, the image generating section 500 carries out the predetermined image processing based on the area information indicating whether or not the subject of interest extracted by the subject detection section 400 is present. The image generating section 500 separates the image data obtained by each of the image pickup sections 100 and 200 into two areas based on binary information acquired by the subject detection section 400. The image generating section 500 carries out the first image processing α on the area in which the subject of interest such as the fence 12 is present. The image generating section 500 carries out the second image processing β, which is different from the first image processing α, on the area in which the subject of interest such as the fence 12 is not present. The image generating section 500 then integrates the image data subjected to the first image processing α with the image data subjected to the second image processing β, to acquire one image data.

The image generating section 500 operates in accordance with a flowchart of a basic operation shown in FIG. 7. The temporary storage section 600 stores the binary information acquired by the subject detection section 400 and the criterion image data Ds and reference image data Dr acquired by the image input section 100a and shown in, for example, FIGS. 6A and 6B.

In step S501, the image generating section 500 reads the binary information and criterion image data Ds stored in the temporary storage section 600. The image generating section 500 separates the read criterion image data Ds into two areas based on the binary information.

In step S502, the image generating section 500 carries out the first processing α on the area resulting from the separation and in which the subject of interest is present. In step S503, the image generating section 500 carries out the second processing β, which is different from the first processing α, on the area in which the subject of interest is not present.

In step S504, the image generating section 500 integrates the image data subjected to the first image processing α with the image data subjected to the second image processing β, to acquire one image data.

In step S505, the image generating section 500 displays the image data resulting from the integration, on the display section 700. The image generating section 500 carries out output processing such as storage of the image data resulting from the integration in the storage means 800.

Now, description will be given of an operation of removing the obstruction such as the fence 12 after focusing estimation has been performed by the distance information acquisition section 300 according to the above-described first embodiment.

After focusing estimation is performed by the distance information acquisition section (focusing estimation section) 300, the image generating section 500 separates, for example, the criterion image data Ds shown in FIG. 6A into two areas based on the binary image data acquired by the subject detection section 400. The binary information indicates whether or not the obstruction such as the fence 12 is present in front of the person 11 corresponding to the main subject. Thus, if the criterion image data Ds is separated based on the binary information, the criterion image data Ds is separated into, for example, image data Ds-1 showing the person 11 or the like present behind the obstruction such as the fence 12 as shown in FIG. 8A and image data Ds-2 showing the obstruction such as the fence 12 and the forward side of the fence 12 as shown in FIG. 8B.

Figure 8A:
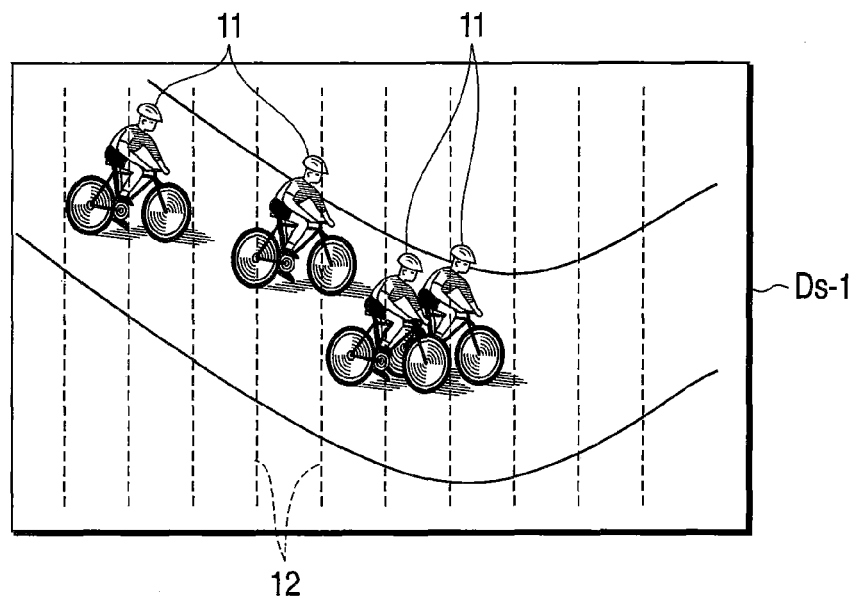
FIG. 8A is a schematic diagram showing image data on a person present behind an obstruction separated by a third embodiment of an image pickup apparatus comprising a focusing device according to the present invention.

After the criterion image data Ds is separated into the two image data Ds-1 and Ds-2, the image generating section 500 carries out the first image processing α on the obstructing area in which the obstruction such as the fence 12 corresponding to the subject of interest is present as shown in FIG. 8A. In the first image processing α, an image signal (first image signal) for the obstruction such as the fence 12 in the obstructing area is determined to be a defect pixel. The image signal for the defective pixel is obtained by interpolating image signals for surroundings in the same frame.

The second image processing β does not particularly involve processing related to the removal of the obstruction such as the fence 12.

Figure 8B:
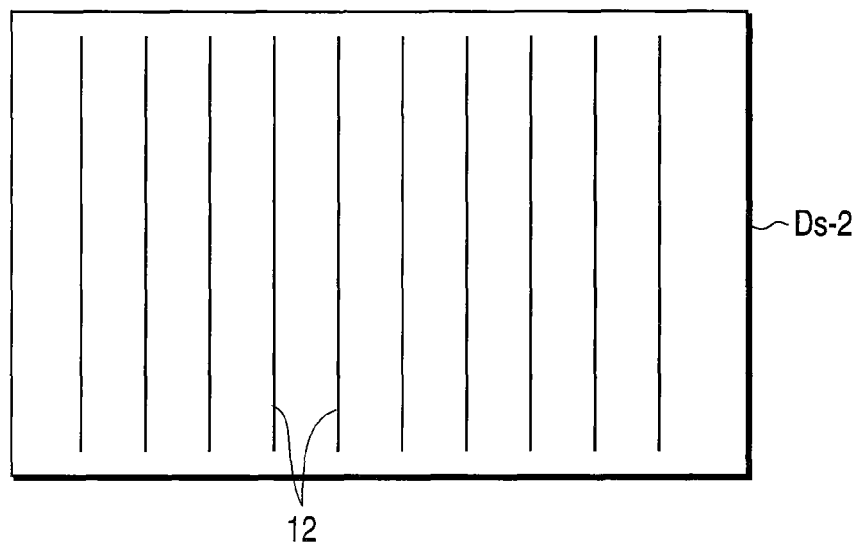
FIG. 8B is a schematic diagram showing image data on the obstruction separated by the image pickup apparatus and on the forward side of the obstruction.
Figure 9:
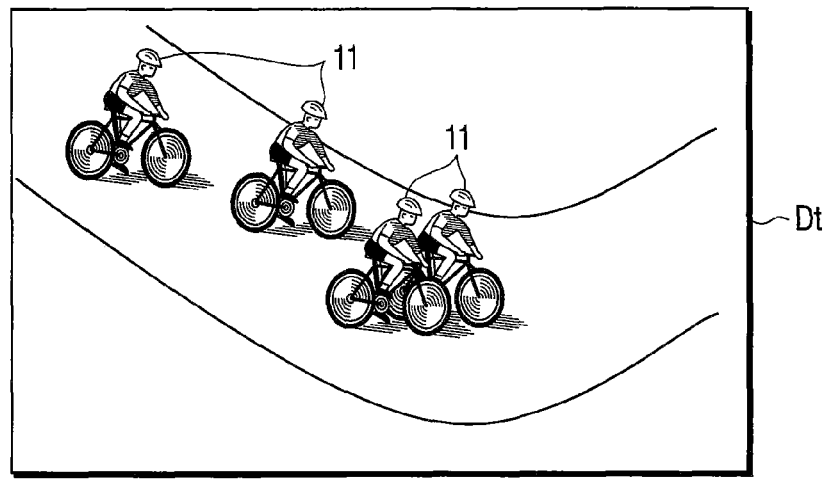
FIG. 9 is a schematic diagram showing image data generated by image generating means of the image pickup apparatus and which is free from the obstruction.

The image generating section 500 integrates the image data Ds-1 shown in FIG. 8A with the image data Ds-2 shown in FIG. 8B and subjected to the replacement process, to acquire, for example, image data Dt such as the one shown in FIG. 9. The image data Dt does not contain the obstruction such as the fence 12 which otherwise obstructs image taking of the person 11. Furthermore, the image data Dt is generated by interpolating the image data Ds-1 with another image data for the removed obstruction such as the fence 12, for example, the image data Ds-2.

The image generating section 500 outputs the image data Dt by, for example, allowing the display section 700 to display the image data Dt or storing the image data Dt in the storage means 800. In the first image processing α, the obstruction such as the fence 12 may be removed by replacement with a particular color described in, for example, Jpn. Pat. Appln. KOKAI Publication No. 2006-30192 and interpolation that uses at least three images.

Thus, according to the third embodiment, the focusing of the area in which the obstruction such as the fence 12 is not present is estimated as follows. To estimate the focusing of the main subject based on the distance information on the second areas fa1 to fan and fb1 to fbn in which the subject of interest is not present, the subject detection section 400 recognizes the face site of person 11 corresponding to the main subject, for example, the eyes, the nose, or the face line, based on the criterion image data Ds and reference image data Dr acquired by the two image pickup sections 100 and 200 and the data indicative of the feature points of the face site. The subject detection section 400 estimates the focusing of the recognized face site and then performs an operation of removing the obstruction.

As described above, as is the case with the above-described first embodiment, the focusing estimation is performed after the face site of person 11 corresponding to the main subject, for example, the eyes, the nose, or the face line, has been recognized. Thus, the focusing of the person 11 corresponding to the main subject can be accurately estimated. Then, such image data Dt as shown in FIG. 8 can be generated by removing the obstruction such as the fence 12 and interpolating the image data with another image signal for the removed image portion.

Thus, the predetermined settings are finished before image taking so as to simplify operations required for the image taking. This enables the image taking to be achieved by conventional operations. Consequently, even with the presence of the obstruction such as the fence 12, images can be taken with the main subject such as the person 11 appropriately in focus. As a result, the image data Dt free from the obstruction such as the fence 12 can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, in the above-described embodiments, the image pickup apparatus in the twin-lens stereo camera comprises the image processing device. However, the present invention is not limited to this aspect. The present invention may be applied to an image processing device to which a plurality of image data taken at a plurality of different viewpoint positions and which, based on the input image data, acquires image data free from the obstruction such as the fence 12.

Furthermore, the subject is not limited to the person 11 but may be, for example, a vehicle such as a traveling train or car, or a flying object.

The subject detection section 400 recognizes the face site based on the data indicative of the feature points of the pre-registered face site, for example, the components of the face site such as the eyes, the nose, and the face line. However, the present invention is not limited to this aspect. The recognition may be carried out based on a characteristic portion, for example, a uniform number.

What is claimed is:

1. A focusing device comprising:
a distance information acquisition section configured to acquire information on a distance to a subject based on a plurality of image data acquired by taking images of the subject at a plurality of different viewpoint positions;
a subject detection section configured to detect a first area and a second area based on the distance information acquired by the distance information acquisition section and threshold information for the distance range within which a subject of interest that obstructs a main subject in the subject is present,
the subject of interest being present in the first area in each of the plurality of image data,
the subject of interest not being present in the second area; and
a focusing estimation section configured to carry out the focusing estimation on the main subject based on the distance information on the second area in each of the plurality of image data.

2. The focusing device according to claim 1,
wherein the distance information acquisition section sequentially acquires the distance information for each of the plurality of image data acquired by consecutively taking images of the subject at the viewpoint positions,
the subject detection section detects the first area and the second area in each of the plurality of consecutively acquired image data, and
the focusing estimation section sequentially carries out the focusing estimation on the main subject based on the distance information on the second area sequentially detected by the subject detection section.

3. The focusing device according to claim 1,
wherein the focusing estimation section carries out the focusing estimation on the main subject by hill climbing using the image data on the second area.

4. The focusing device according to claim 1, further comprising:
an image recognition section configured to generate a plurality of evaluation values using, as an index, similarity of each of a plurality of feature points of the main subject in the plurality of image data, integrate the evaluation values together, and recognize whether or not the second area corresponds to the main subject based on the evaluation values for the second area after the integration process.

5. The focusing device according to claim 1, wherein the image recognition section generates and integrates the evaluation values for each site of the main subject together.

6. The focusing device according to claim 4, wherein before generating and integrating the evaluation values for each site of the main subject together, the image recognition section determines the evaluation values for a obstructing area corresponding to the subject of interest to indicate a part of the main subject.

7. The focusing device according to claim 1, further comprising:
an image generating section configured to, after the focusing estimation section carries out the focusing estimation, separate one of the plurality of image data into two image data based on a position of the subject of interest and carry out image processing on the two image data to acquire image data free from the subject of interest.

8. The focusing device according to claim 2, further comprising:
an image generating section configured to, after the focusing estimation section carries out the focusing estimation, separate one of the plurality of image data into two image data based on a position of the subject of interest and carry out image processing on the two image data to acquire image data free from the subject of interest.

9. The focusing device according to claim 3, further comprising:
an image generating section configured to, after the focusing estimation section carries out the focusing estimation, separate one of the plurality of image data into two image data based on a position of the subject of interest and carry out image processing on the two image data to acquire image data free from the subject of interest.

10. The focusing device according to claim 4, further comprising:
an image generating section configured to, after the focusing estimation section carries out the focusing estimation, separate one of the plurality of image data into two image data based on a position of the subject of interest and carry out image processing on the two image data to acquire image data free from the subject of interest.

11. An image pickup apparatus comprising:
a distance information acquisition section configured to acquire information on a distance to a subject based on a plurality of image data acquired by taking images of the subject at a plurality of different viewpoint positions;
a subject detection section configured to detect a first area and a second area based on the distance information acquired by the distance information acquisition section and threshold information for the distance range within which a subject of interest that obstructs a main subject in the subject is present,
the subject of interest being present in the first area in each of the plurality of image data,
the subject of interest not being present in the second area;
a focusing estimation section configured to carry out the focusing estimation on the main subject based on the distance information on the second area in each of the plurality of image data; and
an image generating section configured to acquire image data by taking images of the subject including the main subject on which the focusing estimation has been carried out by the focusing estimation section.

12. The image pickup apparatus according to claim 11,
wherein the distance information acquisition section sequentially acquires the distance information for each of the plurality of image data acquired by consecutively taking images of the subject at the viewpoint positions,
the subject detection section detects the first area and the second area in each of the plurality of consecutively acquired image data, and
the focusing estimation section sequentially carries out the focusing estimation on the main subject based on the distance information on the second area sequentially detected by the subject detection section.

13. The image pickup apparatus according to claim 11,
wherein the focusing estimation section carries out the focusing estimation on the main subject by hill climbing using the image data on the second area.

14. The image pickup apparatus according to claim 11, further comprising:
an image recognition section configured to generate a plurality of evaluation values using, as an index, similarity of each of a plurality of feature points of the main subject in the plurality of image data, integrate the evaluation values together, and recognize whether or not the second area corresponds to the main subject based on the evaluation values for the second area after the integration process.

15. The image pickup apparatus according to claim 14, wherein the image recognition section generates and integrates the evaluation values for each site of the main subject together.

16. The image pickup apparatus according to claim 14, wherein before generating and integrating the evaluation values for each site of the main subject together, the image recognition section determines the evaluation values for a obstructing area corresponding to the subject of interest to indicate a part of the main subject.

17. The image pickup apparatus according to claim 11, further comprising:
an image generating section configured to, after the focusing estimation section carries out the focusing estimation, separate one of the plurality of image data into two image data based on a position of the subject of interest and carry out image processing on the two image data to acquire image data free from the subject of interest.

18. The image pickup apparatus according to claim 12, further comprising:
an image generating section configured to, after the focusing estimation section carries out the focusing estimation, separate one of the plurality of image data into two image data based on a position of the subject of interest and carry out image processing on the two image data to acquire image data free from the subject of interest.

19. The image pickup apparatus according to claim 13, further comprising:
an image generating section configured to, after the focusing estimation section carries out the focusing estimation, separate one of the plurality of image data into two image data based on a position of the subject of interest and carry out image processing on the two image data to acquire image data free from the subject of interest.

20. The image pickup apparatus according to claim 14, further comprising:
an image generating section configured to, after the focusing estimation section carries out the focusing estimation, separate one of the plurality of image data into two image data based on a position of the subject of interest and carry out image processing on the two image data to acquire image data free from the subject of interest.

* * * * *